United States Patent
Kerrebrock

(10) Patent No.: US 6,192,670 B1
(45) Date of Patent: Feb. 27, 2001

(54) RADIAL FLOW TURBINE WITH INTERNAL EVAPORATIVE BLADE COOLING

(76) Inventor: Jack L. Kerrebrock, 108 Tower Rd., Lincoln, MA (US) 01773

( * ) Notice: Subject to any disclaimer, the term of this patent is extended or adjusted under 35 U.S.C. 154(b) by 0 days.

(21) Appl. No.: 09/333,364

(22) Filed: Jun. 15, 1999

(51) Int. Cl.⁷ ................................... F02C 3/00
(52) U.S. Cl. .................................... 60/39.75
(58) Field of Search ..................... 60/39.512, 736, 60/39.75; 417/407

(56) References Cited

U.S. PATENT DOCUMENTS

| | | | |
|---|---|---|---|
| 2,667,326 | 1/1954 | Ledinegg | 253/39.15 |
| 2,737,366 | 3/1956 | Ledinegg | 253/39.15 |
| 2,744,723 | 5/1956 | Roush | 253/39.15 |
| 2,812,157 | 11/1957 | Turunen et al. | 253/39.15 |
| 2,849,210 | 8/1958 | Turunen et al. | 253/39.15 |
| 2,952,441 | 9/1960 | Jones | 253/39.15 |
| 3,738,771 | 6/1973 | Delarbre et al. | 416/96 |
| 3,842,596 | 10/1974 | Gray | 60/39.66 |
| 3,902,820 | 9/1975 | Amos | 416/97 |
| 3,963,368 | 6/1976 | Emmerson | 415/115 |
| 4,022,542 | 5/1977 | Barbeau | 416/97 A |
| 4,118,145 | 10/1978 | Stahl | 416/96 R |
| 4,179,240 | 12/1979 | Kothmann | 416/96 R |
| 4,302,153 | 11/1981 | Tubbs | 416/96 R |
| 4,314,794 | 2/1982 | Holden et al. | 416/97 A |
| 4,330,235 | 5/1982 | Araki | 416/96 R |
| 4,422,229 | 12/1983 | Sadler et al. | 29/156.8 H |
| 4,437,810 | 3/1984 | Pearce | 415/115 |
| 4,440,834 | 4/1984 | Aubert et al. | 428/554 |
| 4,498,301 | 2/1985 | Tsubouchi | 60/657 |
| 4,506,634 | 3/1985 | Kerrebrock | 123/68 |
| 4,507,051 | 3/1985 | Lesgourgues et al. | 416/97 R |
| 4,522,562 | 6/1985 | Glowacki et al. | 416/95 |
| 4,529,358 | 7/1985 | Papell | 416/97 A |
| 4,604,031 | 8/1986 | Moss et al. | 416/97 R |
| 4,648,799 | 3/1987 | Brown et al. | 416/95 |
| 4,668,162 | 5/1987 | Cederwall et al. | 415/115 |
| 4,898,514 | 2/1990 | McCracken | 416/95 |
| 5,299,418 | * 4/1994 | Kerrebrock | 60/39.75 |

* cited by examiner

Primary Examiner—Timothy S. Thorpe
Assistant Examiner—William Rodriguez
(74) Attorney, Agent, or Firm—Thomas J. Engellenner; Michael I. Falkoff; Nutter, McClennen & Fish, LLP

(57) ABSTRACT

A radial flow turbine has a rotor with an internal cavity that includes a vaporization section and a condensation section. The condensation section is disposed radially inward toward the shaft and the vaporization section extends radially outward adjacent to the surface of the rotor blade. The vaporization section includes a series of pockets for dispersing the cooling fluid within each blade, and a cascaded series of capture protrusions to distribute the liquid coolant to the successive radially-arrayed pockets. A working system includes a centrifugal compressor which feeds a compressed air fuel mixture to an annular combustion chamber that, in turn, feeds the combustion gases along a radial direction to impinge on the surface of the cooled radial flow rotor. Optionally, the system is a regenerative system including a heat exchange sub-assembly which couples heat from the exhaust stream to a position between the compressor and combustion chamber.

7 Claims, 4 Drawing Sheets

RADIAL FLOW TURBINE WITH INTERNAL EVAPORATIVE BLADE COOLING

CROSS-REFERENCE TO RELATED APPLICATIONS

Not Applicable.

STATEMENT REGARDING FEDERALLY SPONSORED RESEARCH

Not Applicable.

FIELD OF THE INVENTION

This invention relates generally to the field of turbines and power systems. Fuel fired internal combustion engines such as gas turbine engines utilize a working fluid, namely an air/fuel mixture, which changes composition during combustion to drive the turbine with hot expanded gases. A conventional gas turbine engine includes a compressor, a combustion chamber and a turbine made up of an arrangement of stators and rotors. Each of the rotors includes blades and a supporting disk. Ideally, for the optimum extraction of energy, the combustion process should occur at about 4000° Fahrenheit. However, as a practical matter due to metallurgical concerns, the components of a turbine must operate at considerably lower temperatures. Cooling of the stationary housing and stators in combustion chamber walls is relatively straightforward by any of a number of means; however the rotors, due to their high rotational speed, present many problems for conventional cooling.

Various approaches have been proposed for utilizing internal fluid cooling to more effectively cool engine parts such as combustion chamber walls, turbine rotors and stators. In the case of rotor blades, some approaches have involved the internal use of a vaporizable cooling fluid that travels from the root of the rotor out through the tip of the rotor blade. Another approach has been to utilize a closed cycle cooling system in which a cooling fluid occupies only a portion of an internal cavity in the blade and circulates as a heat exchange medium. The physical properties of the cooling fluid are such that it is vaporized in certain regions of the cavity by virtue of the operating temperature prevailing in those regions during normal operation of the engine. Applicant has previously obtained a patent, U.S. Pat. No. 5,299,418, which describes one particularly advantageous structure for closed circulation of a vaporizable liquid phase coolant within the cavity of a turbine blade. The improvement claimed in that patent involves a geometry for distributing coolant fairly uniformly over the inner surface of a blade in an axial-flow gas turbine so as to achieve a distributed cooling effect for the entire blade.

While that patent illustrates an axial flow turbine with its characteristic blade shape, other forms of turbine have a configuration entirely different and pose different challenges to implementing effective coolant circulation. Thus, for example, in a relatively common turbine architecture utilizing a centrifugal compressor with an annular combustion chamber to feed a radial flow turbine, the foregoing construction would find no application. Similarly, in the case of smaller turbines where a regenerative loop architecture is used to enhance heat efficiency of a radial flow turbine, the aforesaid patented construction would not apply.

Accordingly, it would be desirable to provide a system and construction for cooling the blades of a radial flow turbine so that the combustion process may be operated at higher temperatures without impairing the structural integrity of the turbine itself.

In general, it is an object of the invention to provide an internal combustion engine wherein higher combustion temperatures can be achieved while maintaining material temperatures at levels at least as low as those associated with known turbine engines.

Another object of the invention is to provide a radial flow gas turbine engine utilizing closed cycled evaporative cooling for the moving parts of the engine.

Still another object is to provide a rotor or rotor blade for use in a turbine of such an engine.

SUMMARY OF THE INVENTION

One or more of the above desirable objects are achieved in accordance with the present invention by a system including a radial flow turbine having an arrangement of one or more stators and rotors in which each of the rotors defines an internal cavity that includes a vaporization section and a condensation section. The condensation section is disposed radially inward toward the shaft and the vaporization section extends over the rotor in thermal proximity to the blades. The vaporization section includes a series of pockets or passages for dispersing the cooling fluid proximate to heated surfaces of each blade, and a cascaded series of catchment channels or protruding shelves to distribute coolant to the pockets. A working system includes a centrifugal compressor which feeds a compressed air/fuel mixture to an annular combustion chamber that, in turn, provides hot gases along a radial direction to impinge on the surface of a radial flow rotor. Optionally, the system is a regenerative system including a heat exchange sub-assembly which couples heat from the exhaust stream to a position between the compressor and combustion chamber.

BRIEF DESCRIPTION OF THE DRAWINGS

These and other features of the invention will be understood from the description below taken in conjunction with the accompanying drawings, wherein.

DETAILED DESCRIPTION

In the prior art there have been many proposals to cool turbine blades by providing a vaporizable liquid in a hollow chamber formed in each blade. For example, U.S. Pat. Nos. 2,812,157 and 2,952,441 each show such an arrangement. More recently, applicant has proposed in U.S. Patent 5,299,418 an arrangement whereby such a phase change coolant evaporates and condenses within the blade of an axial flow turbine. In the device of that patent, coolant circulation is controlled and uniformized to some extent by a plurality of transverse ridges or capture shelves which cause the cooling fluid to cascade outwardly in the centrifugal field and be distributed at successive radial levels extending along the inner surface of the blade.

Figure 1:
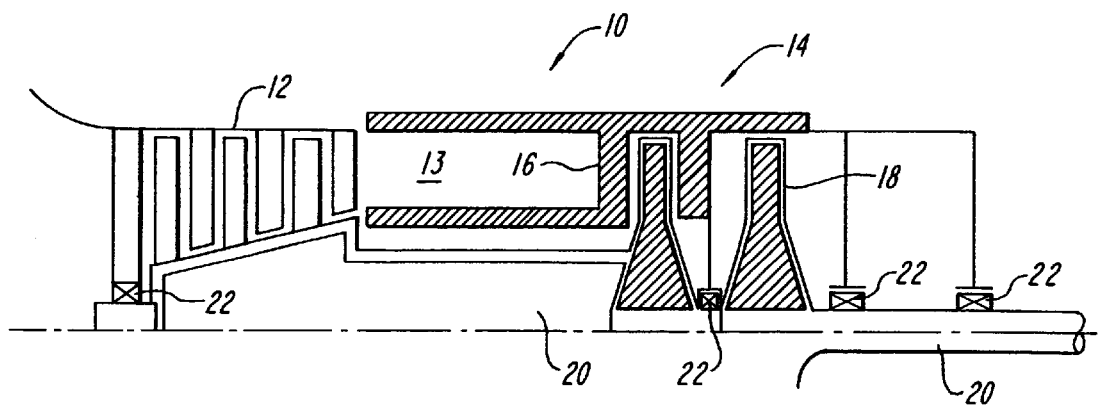
FIG. 1 is a schematic diagram of an axial flow gas turbine of the prior art.
Figure 2:
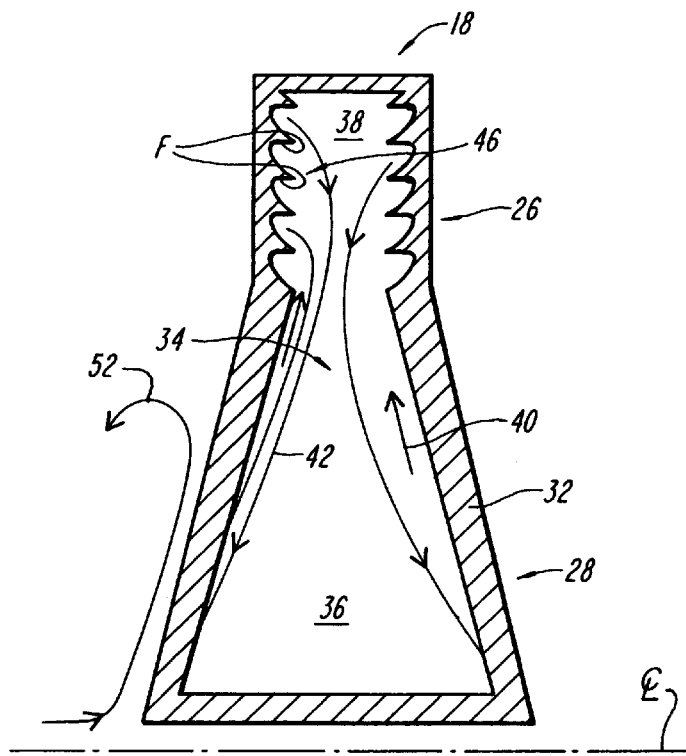
FIG. 2 is a schematic diagram of a prior art evaporatively cooled blade for the turbine of FIG. 1.

FIGS. 1 and 2 illustrate an axial flow turbine system and the cooled blades of that patent, which is hereby incorporated herein in its entirety. As shown therein, an engine 10 includes a compressor 12, a combustion chamber 13, and a turbine 14. The turbine 14 comprises an arrangement of stators 16 and rotors 18, with the rotors being connected to drive shafts 20 that are supported in bearings 22. Through rapid combustion, working fluid exiting the combustion chamber 13 performs work on the rotors 18 and causes them to drive the shafts 20. As best seen in FIG. 2, each of the rotors 18 of that prior art system includes an internal cooling system carried out by phase transition and circulation in a closed cycle of a cooling fluid within the blade. The liquid phase of the cooling fluid occupies a portion only of an internal cavity provided in the rotor.

This internal cavity is more clearly shown in FIG. 2, which is a cross-section of a representative rotor 18. The rotor 18 is formed with a wall 32 that encloses an internal cavity 34. The internal cavity 34 is divided into a condensing section 36 located along a radially inward section at the rotor disk 28, and a vaporization section 38 located more outwardly to effect heat transfer at the rotor blade 26. Typically multiple rotor blades 26 are supported by the rotor disk 28.

Cooling fluid F is contained within the internal cavity 34 and receives heat from the wall 32 at the vaporization section 38 which resides in the flow of combustion gases of the engine working fluid. The physical properties of the cooling fluid are such that it vaporizes at the temperatures experienced in the vaporization section 38 during normal operation of the rotor 18. Various liquid metals such as sodium, potassium or a mixture of these are suitable for use as the cooling fluid F. Other appropriate cooling fluids will be apparent to those skilled in the art.

The geometry and operation of the axial flow turbine of FIGS. 1 and 2 results in a flow of the cooling fluid F in liquid phase in the direction of the arrows 40 to the vaporization section 38, and the flowing cooling fluid is distributed over the internal surface of the wall 32 by the array of protruding ridges or lips 46 which are arranged so that the cooling fluid cascades from one ridge radially outward to the next ridge while some fluid is evaporated at each ridge and thereby removes heat from the area of the wall 32 locally in that region. The vaporized fluid filling the section 38 experiences a radially inward flow as vapor in the direction of arrows 42 to the condensing section 36, where it re-liquefies to again circulate outward and effect further cooling. Return of the vapor is effected by a pumping action generated by the difference in vapor pressures in the vaporization and condensing sections of the rotor 18. Thus, the overall operation involves a cooling liquid washing radially outward over a ridge plate.

The present invention is directed to implementation of a cooling structure for a different form of turbine, in which the blades take a different geometry, namely that of a radial flow turbine.

Figure 3:
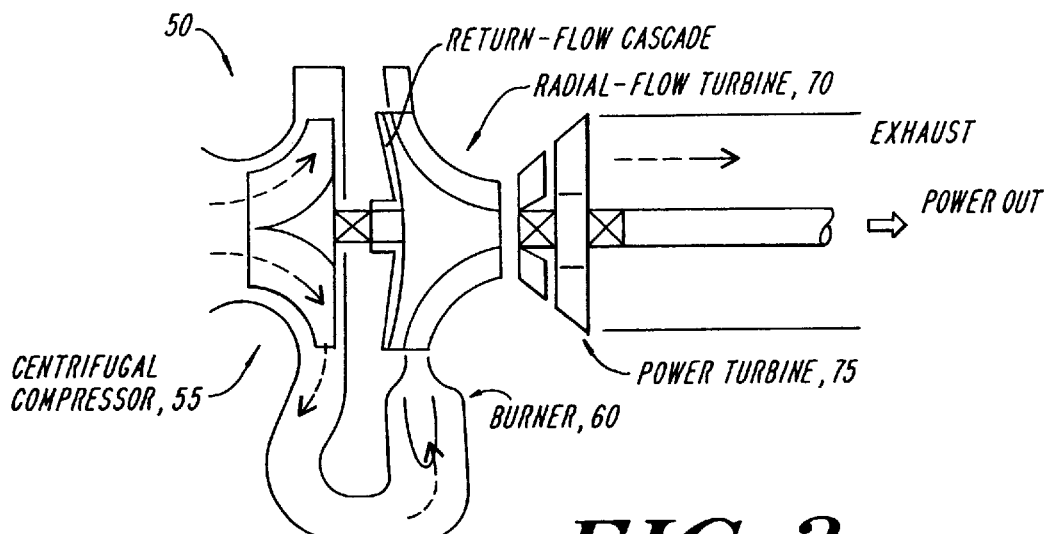
FIG. 3 illustrates a radial flow turbine and centrifugal compressor suitable for the practice of the present invention.

FIG. 3 illustrates a basic radial flow turbine system 50, in which illustratively a centrifugal compressor 55 provides a flow of working fluid to a combustion chamber 60 disposed circumferentially about the radially outer periphery of a turbine 70, and wherein the turbine 70 has blades disposed for movement in a radially-directed flow of the hot combustion gases. As shown, the heated gas may then be provided to a second stage power turbine 75, that may be driven by either radial or axial flow.

Figure 4:
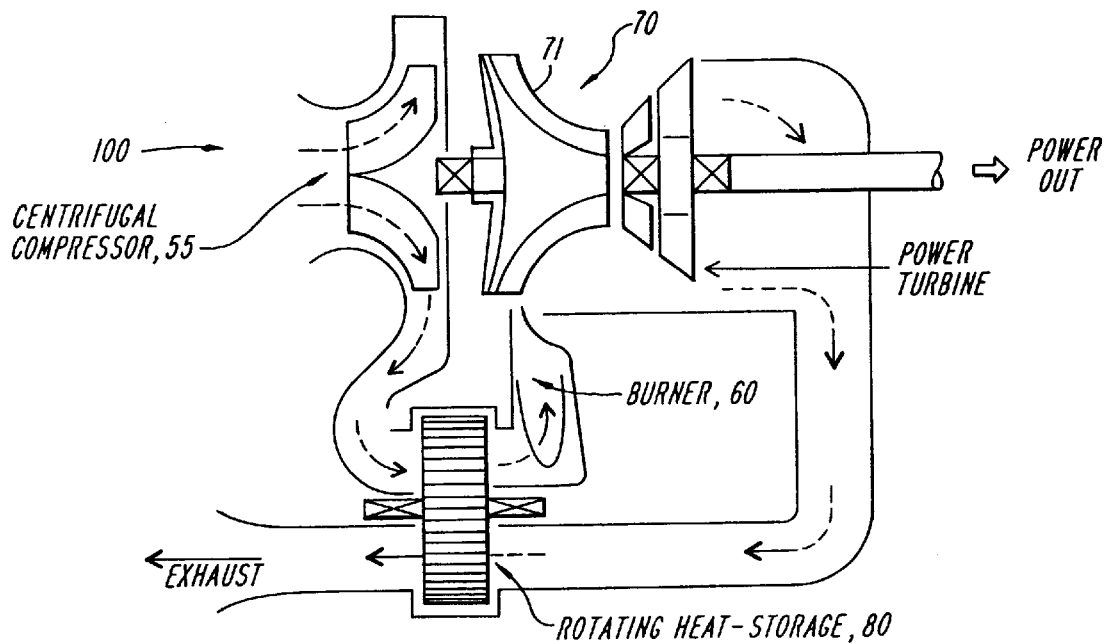
FIG. 4 illustrates a regenerative radial flow gas turbine suitable for the practice of the present invention.

FIG. 4 illustrates another system 100 also employing a radial flow turbine 70. System 100 differs from the system 50 of FIG. 3 in having a heat exchange unit 80 shown as a rotating heat storage unit, at a position to preheat the working fluid or air exiting from the compressor with energy from the turbine output stream before the working fluid enters the combustion chamber 60. Such an architecture is common in smaller turbines where it is desired to increase the overall thermal efficiency. In both the system 50 of FIG. 3 and the system 100 of FIG. 4, the combustion gases pass in a radial direction to drive the turbine 70, impinging on the rotor and blade assembly 71.

Figure 5:
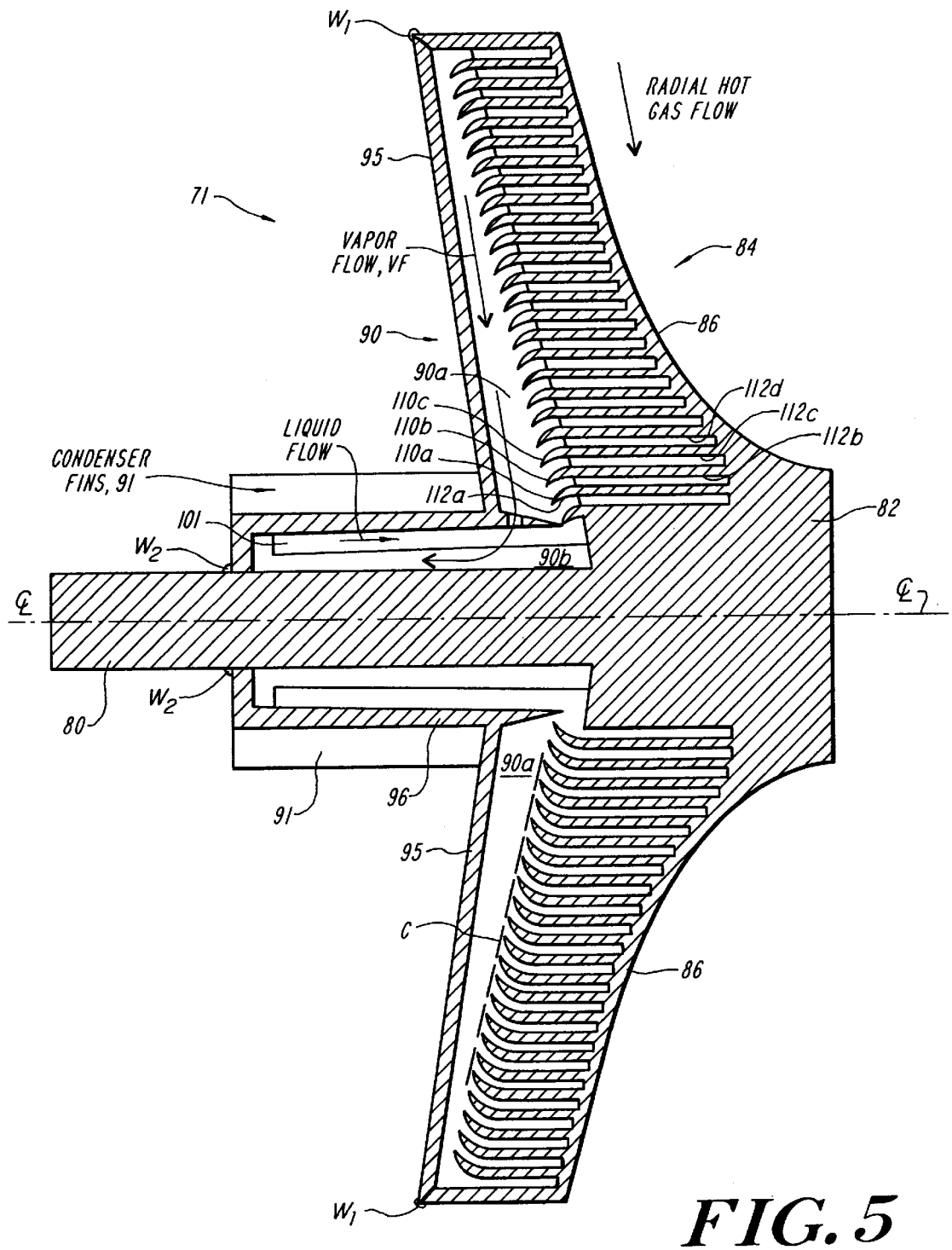
FIG. 5 shows a cross-section through a disk and radial flow turbine blade of the present invention for use in the systems of FIGS. 3 and 4.

In accordance with the present invention, the assembly 71 is configured such that the rotor assembly includes an internal chamber containing a vaporizable fluid and arranged for vaporization and condensation of the fluid to effectively cool the blades carried by the rotor and residing in the hot combustion gases. FIG. 5 illustrates the evaporatively cooled radial flow turbine blade element of the present invention.

Figure 5A:
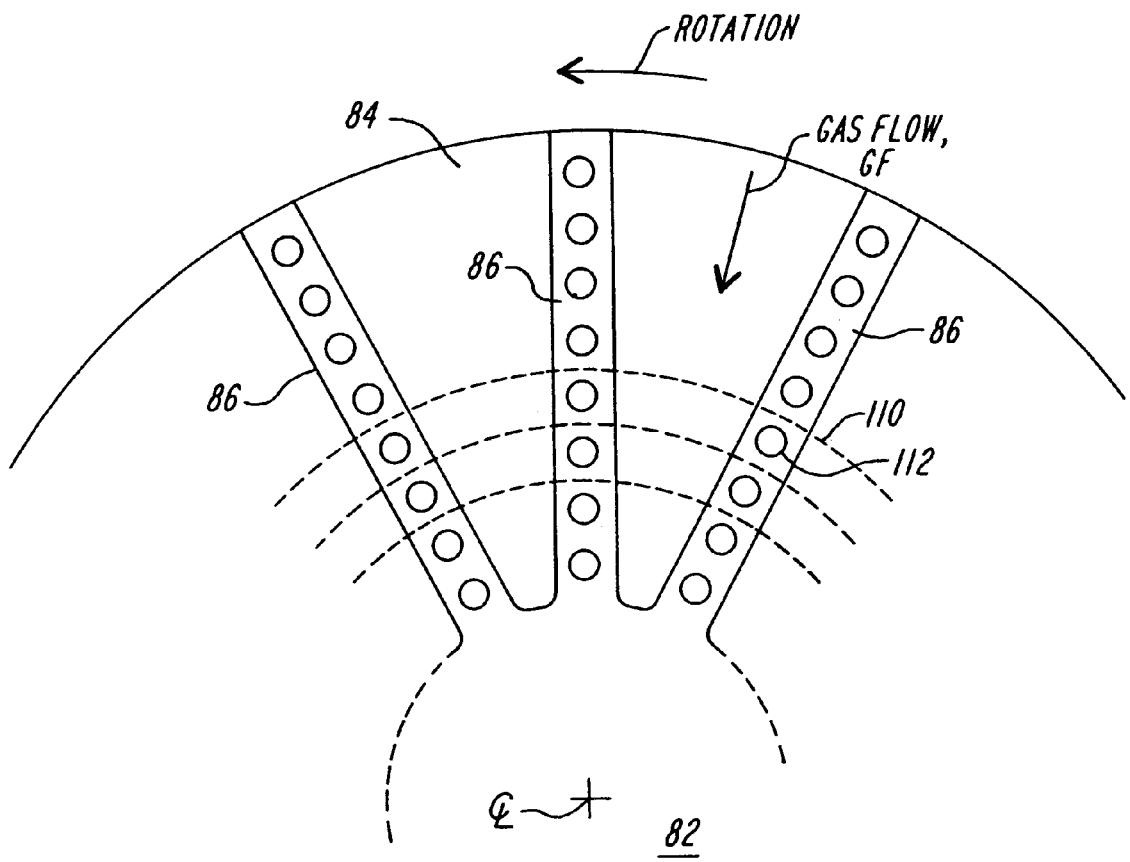
FIG. 5A shows a front plan view of the rotor of FIG. 5, illustrating blade placement and coolant channel alignment.

As shown in FIG. 5, the radial flow rotor assembly 71 comprises a generally central body portion including a shaft 80 and hub 82, with a disk 84 extending radially outward that carries the blades 86. As shown in FIG. 5A, a plan view facing directly along the axis of rotation, the disk 84 carries a plurality of blades 86 which extend from the center outwardly toward the periphery and are arrayed in a regular arrangement configured for catching the hot gas stream and driving the rotor. The direction of gas flow is indicated by the arrow GF, which as shown extends along a generally radial direction. FIG. 5 shows a plane section extending through the rotor 71 in a plane containing the axis and passing centrally through a pair of the blades 86. As shown therein, the rotor is constructed with an internal chamber 90 which is partially filled with a vaporizable heat exchange cooling material such as a metal of moderate vapor point as described above. The chamber 90 includes a vaporization section 90a and a condensation section 90b. The vaporization section 90a extends radially outward along the body of the disk in the region spanned by the blades 86. The condensation section 90b lies radially inward of the vaporization section 90a, and close to the shaft 80. The outer wall of the condensation section 90b may include condensor fins 91 which may, for example, ride in a stream of cooling air supplied to that region of the backside of the disk. Other forms of cooling for the shaft or central hub region may also be used to remove heat from the condensor housing, such as the provision of a circulating coolant through internal passages in the shaft or contiguous bearing or housing structures, with appropriate seals.

As further shown in FIG. 5, circulation of the heat exchange fluid within the chamber 90 proceeds by passage of liquid from the condensation chamber 90b through a liquid transfer viaduct such as a trough, or a drilling, passage or small aperture 101 which may be angled slightly as shown to direct the condensed fluid into the chamber 90a where it is driven centrifugally outward and captured by an overhanging capture lip 110a. The lip, while illustrated in cross-section, will be understood to preferably extend substantially uniformly at a radially constant distance circumferentially around the entire front wall of the chamber 90a. It thus forms a circumferential surface channel or trough, so that as the rotor 71 rotates, the cooling fluid is urged against the slightly dished shelf at constant radial distance and distributed uniformly along the length of the first capture lip 110a.

Extending from the shelf and at the same radial distance, is a recess 112a which extends forwardly into the body of the turbine blade 86, so as to distribute the liquid from the shelf 110a along a penetrating passage into the blade 86 and extending close to its side and front surfaces 86a which are heated by the gas flow. As further shown in FIG. 5, a plurality of similar capture lips 110b, 110c, 110d . . . are positioned at successively greater radial distances from the center or axis of rotation. These successive lips each lie along an incline cone angle indicated by dashed line C, and are positioned such that each extends slightly past the previous one, so that excess fluid driven against the shelf 110a overflows radially outward and is captured by the next shelf 110b, and then successively cascades so that liquid is captured by each of the successive shelves and is distributed to the interior of the blade along a corresponding successive set of recesses or drillings 112b, 112c, 112d . . . . The radially outer edge of each of these distribution apertures 112 extends at the level of the surface of the corresponding shelf 110 to receive liquid coolant therefrom. A similar set of drillings 112a, 112b . . . is formed in each blade of the rotor.

FIG. 5A illustrates the general configuration of the penetrating coolant distribution recesses 112. These may be formed by drilling in from the front face of the blade, i.e., from the right as shown in FIG. 5, to the depth of the shelf 110, then plugging and welding closed the surface of each hole so made in the face of the blade. In a typical manufacturing process, the front, blade-carrying portion of the rotor may be machined as one piece, and the internal chamber structure may then be completed by assembling that piece to a second disk structure consisting of the back wall 95 and central condenser elements 91, 96, 101. Such assembly is illustrated in FIG. 5 by the perimeter welds $W_1$ and $W_2$ closing the two-piece assembly into a structure with an internal chamber arranged for the vaporization, return, condensation and distribution of material in an ordered and highly uniform manner.

In operation, the liquid entering each recess 112 cools the corresponding local region of the rotor blade 86, and is heated so that it vaporizes and fills the vaporization chamber 90a. This results in a flow of the less dense vapor centrifugally inward along a direction of vapor flow indicated by arrow VF. The returning vapor enters the cooler condensing chamber 90b, where it condenses and is again driven by centrifugal force outwardly to the cascaded radial sequence of capture lips 110 for depth dispersion from the shelves into the penetrating pockets 112 to enhance cooling of the blade surfaces. The flow of vapor along the return direction VF is driven in part by the vapor pressure gradient directed toward the cooler region of the condensation chamber 90b.

Thus, the sequence of arcuate capture shelves and penetrating pockets results in a centrifugal distribution of the coolant liquid to remove heat from the angled blade surfaces of the radial flow turbine rotor, while providing a self-sustaining circulation of condensing vapor away from the blades that efficiently cools the entire rotor.

The invention being thus disclosed and a representative embodiment described, further variations and modifications will occur to those skilled in the art, and all such variations and modifications are considered to be within the scope of the invention, as defined by the claims appended hereto and equivalents thereof.

What is claimed is:

1. A rotor assembly for a radial flow gas turbine comprising a rotor body carrying a plurality of blades configured to rotate in a radially directed flow of hot gas, and further comprising a closed coolant chamber in said body having a vaporization subchamber and a condensation subchamber, the vaporization subchamber extending radially outward from the condensation subchamber and being arranged so that i) liquid from said condensation subchamber cascades into a radially arranged set of distribution shelves extending within said rotor behind the plurality of blades, and ii) each distribution shelf disperses said liquid to a pocket penetrating a blade so that the liquid is distributed within the blades to efficiently cool blade surfaces contacting the flow of hot gas.

2. The rotor assembly of claim 1, wherein the condensation subchamber and the vaporization subchamber are arranged and configured to sustain a cyclic flow of vapor from the vaporization subchamber to the condensation subchamber and of liquid coolant from the condensation subchamber to the vaporization subchamber.

3. A gas turbine system comprising a centrifugal compressor, and a combustor and a turbine rotor assembly, the combustor being arranged to direct a radial flow of hot gas through the turbine rotor assembly, and the turbine rotor assembly having an internal vaporization subchamber configured for cascaded distribution of cooling liquid proximate to turbine blades such that the cooling liquid circulates in a vaporization/condensation cycle within the rotor assembly.

4. The gas turbine system of claim 3, wherein the rotor assembly includes a rotor body carrying a plurality of blades configured to rotate in said radially directed flow of hot gas, and said rotor body includes a closed coolant chamber in said body having a vaporization subchamber and a condensation subchamber, the vaporization subchamber extending radially outward from the condensation subchamber and being arranged so that i) liquid from said condensation subchamber cascades into a radially arranged set of distribution shelves extending within said rotor behind the plurality of blades, and ii) each distribution shelf disperses said liquid to a pocket penetrating a blade so that the liquid is distributed within the blades to efficiently cool blade surfaces contacting the flow of hot gas.

5. The gas turbine system of claim 3, further comprising a heat exchanger positioned to heat output of the centrifugal compressor.

6. A cooled rotor assembly for a gas turbine, wherein the rotor assembly is configured for rotational movement in a radially-directed flow of hot gas by impingement of the gas against a plurality of blades at a first surface of the rotor assembly, and further comprising a plurality of capture shelves located on a back surface opposite said first surface, said capture shelves each extending at constant radius and being offset to capture liquid overflowing from a radially inward level as the assembly rotates, and a single condenser operative to receive and liquify vapors formed as heat is transferred form the blades to the liquid dispersed on the capture shelves, so that cooling liquid effectively circulates within the rotor assembly to reduce blade temperature.

7. A radial flow gas turbine rotor comprising i) a blade assembly including a plurality of blades disposed to extract energy form a radially-directed gas flow and having a plurality of recesses penetrating back surfaces of said blades ii) a disk assembly joined to said blade assembly so as to form, together with said recesses a closed vaporization/condensation subchamber effective to provide internal evaporative cooling of the blades.

* * * * *